(12) United States Patent
Ogilvie

(10) Patent No.: US 7,484,313 B1  
(45) Date of Patent: Feb. 3, 2009

(54) ADJUSTABLE CARPENTERS SQUARE WITH TAPE MEASURE

(76) Inventor: James A. Ogilvie, 1252 Amador Ave., Vista, CA (US) 92083

( * ) Notice: Subject to any disclaimer, the term of this patent is extended or adjusted under 35 U.S.C. 154(b) by 0 days.

(21) Appl. No.: 11/830,526

(22) Filed: Jul. 30, 2007

(51) Int. Cl.
*G01B 3/10* (2006.01)
*B43L 7/027* (2006.01)

(52) U.S. Cl. .......................... 33/770; 33/760
(58) Field of Classification Search ............ 33/770, 33/755, 757, 759, 760, 768, 478, 481
See application file for complete search history.

(56) References Cited

U.S. PATENT DOCUMENTS

| | | | | |
|---|---|---|---|---|
| 2,795,050 A * | 6/1957 | Van Fleet | ..................... | 33/757 |
| 5,337,487 A * | 8/1994 | Mangino, Sr. | ................ | 33/760 |
| 5,390,425 A * | 2/1995 | Gilberts | ........................ | 33/764 |
| 5,782,007 A * | 7/1998 | Harris | ......................... | 33/768 |
| 5,787,599 A * | 8/1998 | Clifton | ........................ | 33/760 |
| 5,894,675 A * | 4/1999 | Cericola | ...................... | 33/451 |
| 6,098,303 A * | 8/2000 | Vogel | ......................... | 33/770 |
| 6,226,885 B1 * | 5/2001 | Korich | ....................... | 33/760 |
| 7,219,440 B2 * | 5/2007 | Lewis et al. | .................. | 33/760 |
| 7,281,340 B2 * | 10/2007 | Greally | ....................... | 33/758 |
| 2004/0172846 A1 * | 9/2004 | McRae | ........................ | 33/760 |
| 2005/0034320 A1 * | 2/2005 | Connor | ....................... | 33/760 |
| 2006/0196072 A1 * | 9/2006 | Lewis et al. | .................. | 33/760 |

* cited by examiner

*Primary Examiner*—Christopher W Fulton
(74) *Attorney, Agent, or Firm*—Steven W. Webb

(57) ABSTRACT

An adjustable carpenters square is presented, which aids carpenters in marking and measuring work product to be cut or formed. The adjustable square can be set at a variety of angles to enable cut marking. It also possesses an attached measuring tape and a straight edge to combine three useful features in one tool.

4 Claims, 3 Drawing Sheets

ADJUSTABLE CARPENTERS SQUARE WITH TAPE MEASURE

FIELD OF THE INVENTION

The present invention relates to apparatuses for measuring a work piece, providing means for layout markings, combined with a retractable tape measure.

BACKGROUND OF THE INVENTION

To prepare wood or other materials for cutting or routing, the workman uses a tape measure to measure the piece, a square for making a reliable mark, and a straight edge to draw the mark. A retractable tape measure, usually metal, is used to set the marks based on length from one end of the piece. A workman often has three or more instruments or tools to help with these tasks, including a straight edge, a retractable tape, a square and a marker (pencil or pen).

Combining a set of these tools into a single item that can be easily carried has been approached in the art, for example U.S. Pat. No. 5,787,599 to Clifton, which teaches a combination square and tape measure, with an embedded protractor to set the square at various angles to help in drawing diagonal lines. Other U.S. Pat. Nos. such as 6,226,885 to Korich and 5,782,007 to Harris teach similar tool sets, with variations.

There is till a need for a combination tool that supports the three functions of measuring, marking, and drawing that is reliable and sturdy.

SUMMARY OF THE INVENTION

The present invention consists of a simple piece of metal stock, aluminum or steel, that has a retractable metal tape holder at one end, a guide channel to guide the tape, a straight edge on its underside, and an adjustable t-square that can be set at a plurality of predetermined angles. The square arms are locked in place with a retractable ball bearing and can be easily moved.

The present invention meets the need for a combined hand tool that can perform the indicated functions, can be carried on a belt, is lightweight and durable. The adjustable T-square can be locked firmly at various useful angles and help control the marking function without the use of a protractor.

OBJECTS OF THE INVENTION

It is an object of the present invention to provide a measuring and marking tool utilizing a conventional retractable tape measure in combination with a straightedge and a T-square.

It is a further object of the invention to provide such a tool made from simple materials requiring the minimum amount of machining and assembly.

It is a further object of the invention to provide such a tool capable of marking materials at a variety of preset, useful angles.

DETAILED DESCRIPTION OF THE INVENTION

Figure 1:
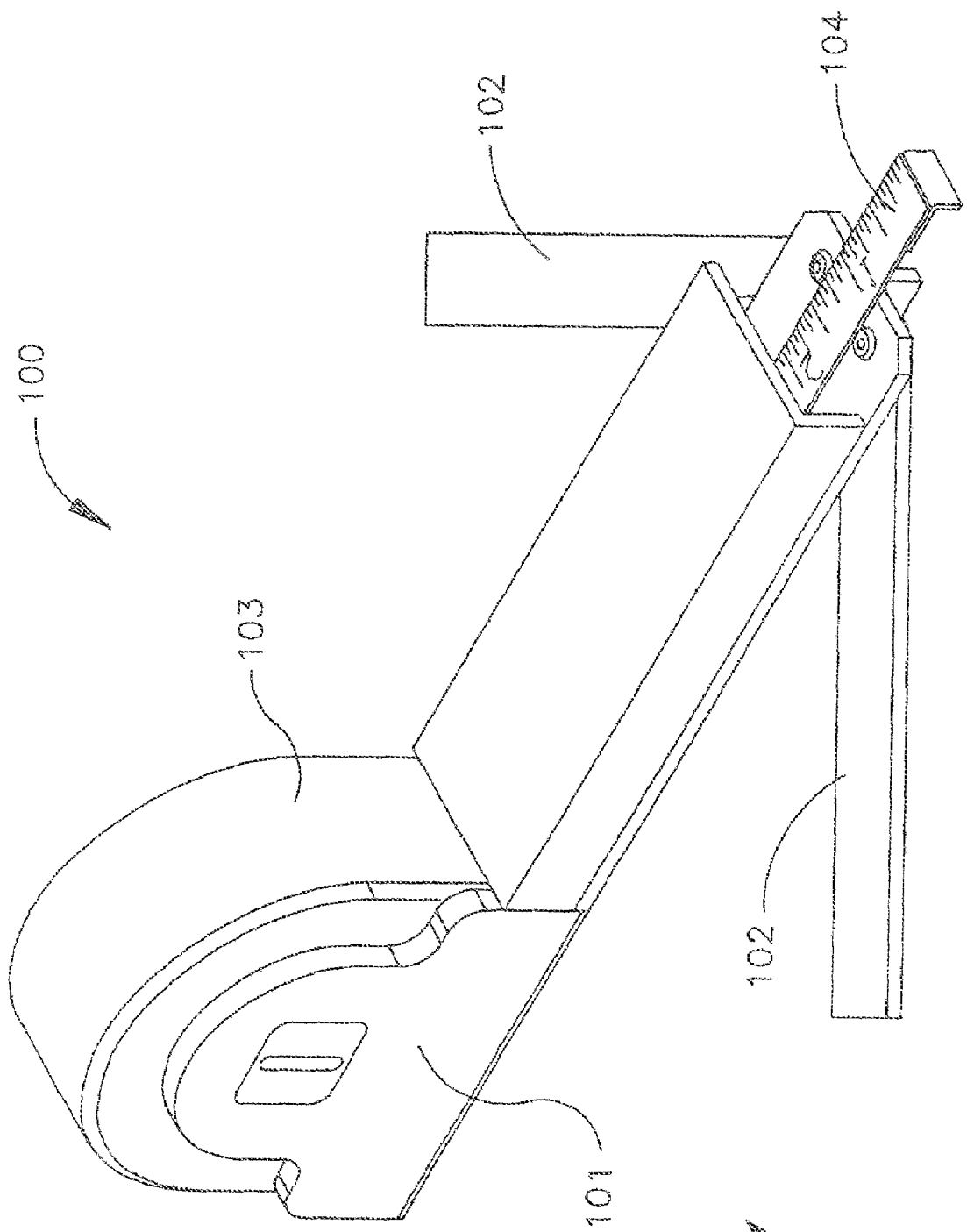
FIG. 1. Perspective view of the invention
FIG. 2. Reverse perspective view of the invention
FIG. 3. Perspective view of invention underside
Figure 2:
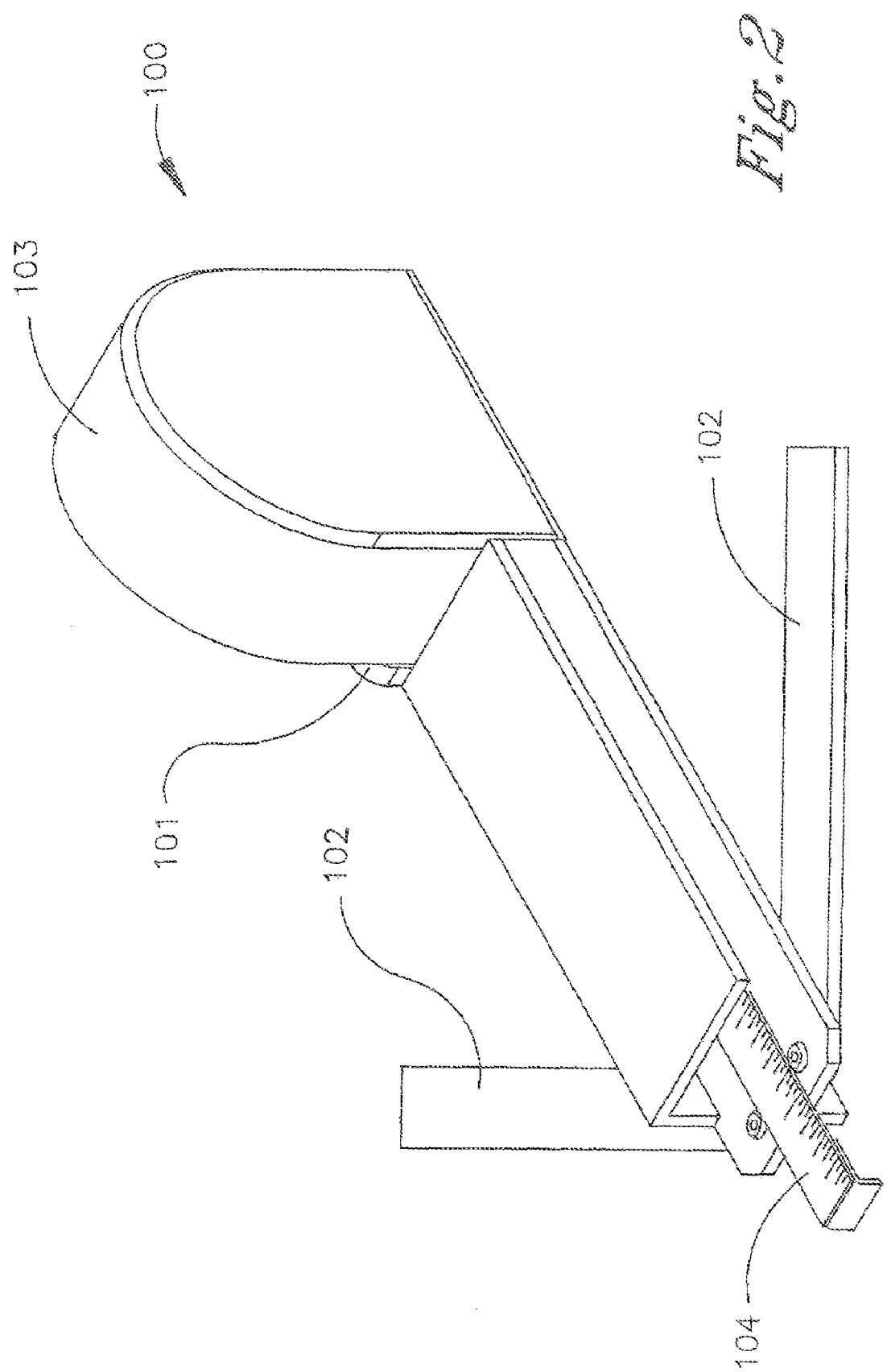
Figure 3:
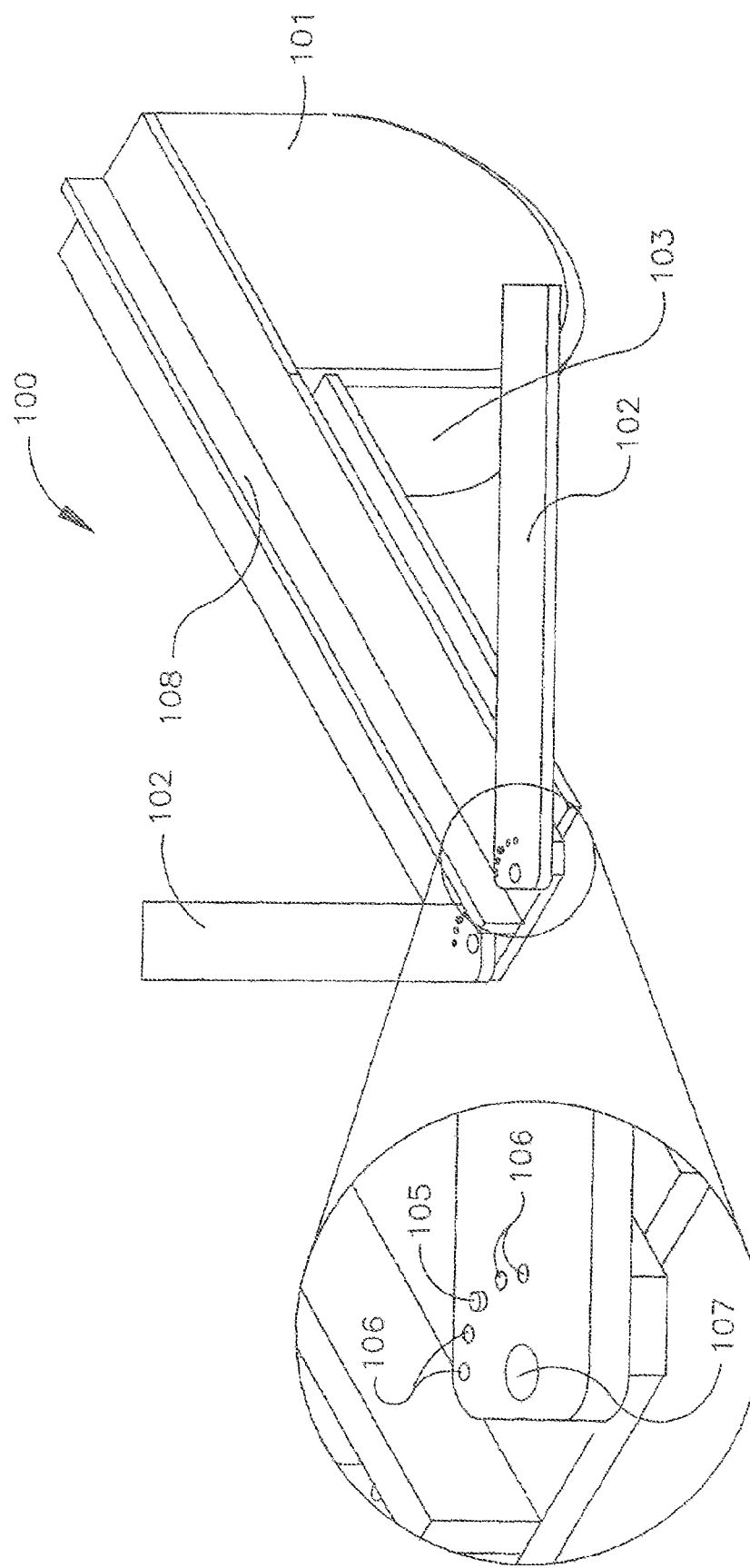

As shown in FIG. 1, FIG. 2, and FIG. 3 the invention 100 in its preferred embodiment is comprised of a tape holder 101, a tape guide 110, a retractable tape cassette 103, two square arms 102, a measuring tape 104, a straight edge 108, two square arm pivots 107, a plurality of guide holes 106, and two retractable bearings 105.

The tape holder 101 extends the length of the invention 100 and serves as the bottom of a channel formed by the tape holder 101 and the tape guide 110. The measuring tape 104 is extended from the retractable tape cassette 103 and extends past the edge of the tape holder 101, able to be pulled further out and used to measure any product to be cut or fastened. The measuring tape 104 will retract and stop such that the bent end of the measuring tape 104 encounters the end of the tape holder.

The underside of the invention 100 possesses a straight edge 108 extending the length of the tape holder 101. This edge can be used to guide a marking implement (pencil or pen) when drawing between marks on the product.

The square arms 102 are attached to the tape holder 101 by means of two square arm pivots 107, and are permitted to rotate easily. The square arms 102 are adjustable in their rotation by means of the preset guide holes 106. A spring loaded retractable bearing 105 permits the arm to be positioned at each of the available angles, and when an arm 102 is moved forcibly, the retractable bearing 105 is pushed down until the next guide hole 106 is presented, whereupon the bearing pops up to fill it, holding the square arm 102 in place.

Although the invention has been described as a preferred embodiment, equivalent features may be employed and substitutions made within this specification without departing from the scope of the invention as recited in the claims.

What is claimed is:

1. An adjustable carpenters square, the carpenters square comprised of a tape holder and a tape cassette, the tape holder possessing an upper side and an under side, the tape holder possessing an elongated rectangular piece of material,
   the tape holder upper side possessing a tape cassette holder to which the tape cassette is attached removably, the tape holder upper side also possessing a tape guide which extends the length of the tape holder from the tape cassette holder to the end of the tape holder, the tape guide possessing an angled piece of material open at one side,
   the tape cassette possessing a long, flexible measuring tape that can be pulled out of the tape cassette and extended through the tape guide to the end of the tape holder,
   the tape holder under side possessing a straight edge raised above the surface of the tape holder under side, extending from one end of the tape holder underside to the other along the longer dimension,
   the tape holder under side possessing two adjustable arms, each arm attached at the end of the tape holder underside away from the tape cassette holder, each adjustable arm attached rotatably to the tape holder underside by means of a pivot point, the pivot points placed on either side of the straight edge, the adjustable arms each possessing a plurality of guide holes punched through their material in a semi circle, the positioning of the guide holes at regular angular displacements around the pivot point,
   the underside of the tape holder possessing two spring-loaded bearings, each spring loaded bearing placed on the tape holder underside such that the bearing will push up through the guide holes when the adjustable arm is positioned at a preselected angle with respect to the pivot point,
   the adjustable arms held adjustably and firmly by means of the spring-loaded bearing extending upwards through the guide holes.

2. An adjustable carpenters square as in claim 1 where the material comprising the tape holder is selected from the list of steel, aluminum, or plastic.

3. A method of using an adjustable carpenters square as in claim 1 or claim 2, the method comprised of the steps of
- obtaining a piece of material to measure,
- extending the flexible measuring tape from the end of the tape cassette through the tape guide past the end of the tape holder to the end of the piece of material,
- hooking the end of the tape over the end of the piece of material,
- laying the adjustable carpenters square along the piece of material and extend the tape by pulling the adjustable carpenters square away from the end of the piece of material to the other end of the material,
- marking the piece of material at an appropriate point along the flexible measuring tape,
- allowing the flexible measuring tape to retract until the end of the tape hooks over the end of the tape holder.

4. A method of using an adjustable carpenters square as in claim 1 or claim 2, the method comprised of the steps of
- opening up one of the adjustable arms, comprised of the substeps of pulling on the end of the adjustable arm away from the pivot point, positioning the adjustable arm such that the retractable bearing pushes up through one of the guide holes,
- placing the adjustable arm alongside an edge of the piece of material to be measured such that the straight edge extends across the piece of material at the desired angle,
- drawing a line along the straight edge from one side of the material to the other.

* * * * *